(No Model.)

J. R. DENISON.
BALL BEARING.

No. 577,103. Patented Feb. 16, 1897.

Witnesses.

G. E. Cilley
G. W. Griffeth

Inventor.

James R. Denison
By Ithiel J. Cilley
Attorney.

UNITED STATES PATENT OFFICE.

JAMES R. DENISON, OF GRAND RAPIDS, MICHIGAN, ASSIGNOR OF ONE-HALF TO JULIUS M. JAMISON, OF SAME PLACE.

BALL-BEARING.

SPECIFICATION forming part of Letters Patent No. 577,103, dated February 16, 1897.

Application filed July 6, 1896. Serial No. 598,231. (No model.)

*To all whom it may concern:*

Be it known that I, JAMES R. DENISON, a citizen of the United States, residing at Grand Rapids, in the county of Kent and State of Michigan, have invented certain new and useful Improvements in Ball-Bearings, of which the following is a specification.

My invention relates to improvements in ball-bearings for use upon bicycles, shafts, or axles, and its objects are, first, to provide a ball-bearing with which the pressure is diametrically central of the balls; second, to provide a ball-bearing having direct pressure upon the balls, with which they may be adjusted to meet any wear upon the balls or the bearings; third, to avert the danger of dust working into the bearings; fourth, to provide a ball-bearing in which the parts may be made of tool-steel and perfectly tempered, and, fifth, to provide a ball-bearing having direct pressure with which the balls may be readily removed and replaced. I attain these objects by the mechanism illustrated in the accompanying drawings, in which—

Figure 1:
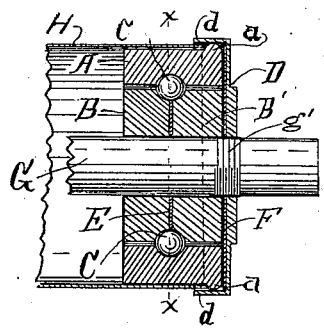
Figure 2:
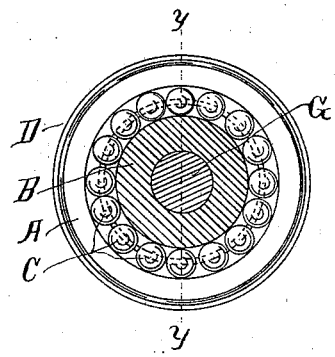

Figure 1 is a transverse vertical section of my bearing. Fig. 2 is a cross-section of the same, and Fig. 3 is a transverse section arranged for the introduction of the balls.

Similar letters refer to similar parts throughout the several views.

I usually construct this bearing in three sections, an outer section or ring and an inner section or ring, which I usually divide laterally to facilitate the introduction of the balls, the portion B being securely attached to the shaft G, and the portion B' is arranged to be removed for the introduction and removal of the balls, being secured to place by means of the nut D. To form the annular groove D' for the action of the balls, I cut a concave from the inner corner of the outer surface of the center ring and a corresponding groove in the inner surface of the outer ring. This groove is made of a proper depth to insure a perfect bearing with the balls, but slightly broader than the balls to avert the danger of lateral friction when in active operation.

Figure 3:
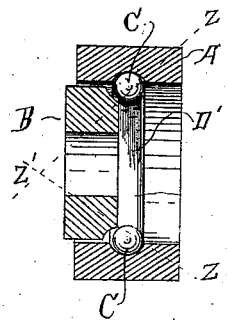

To insert or remove the balls C, it is necessary to remove the section B' of the inner ring and slide the outer ring A to one side, as shown in Fig. 3, sufficiently to allow the balls to pass between the points of bearing on the line Z' Z Z, and when the balls have been introduced the section B' is replaced and all held in place by the nut D, screwed upon the screw-thread $g'$ on the shaft.

I provide for adjusting the bearing by inserting a packing E, of paper or other suitable material, between the two sections of the divided ring, as shown in Fig. 1, in such manner that the removal of a portion or all of it will, in consequence of the elliptical form of the groove, adjust the bearing to take up a certain amount of slack that may occur in consequence of wear that may be produced by the action of the balls.

I avert the danger of dust working into the joints of the bearing by forming a bead $a$ on the periphery of the outer ring, near one end, and forming a flange $d$ on the periphery of the nut D in position to lap over said bead in such a manner that dust cannot approach the bearing without passing over and around the bead, and its passage to the bearing is further obstructed by the introduction of a washer F, of felt or other suitable material, that will absorb an antifriction substance, as oil, and hold the dust in suspension away from the bearing.

In the drawings I have shown my bearing as applied to the broken end of a bicycle-shaft, Figs. 1 and 3 being in section on the line $y\,y$ of Fig. 2, and Fig. 2 being in section on the line $x\,x$ of Fig. 1, and H (shown in Fig. 1) represents a sectional portion of the sleeve that covers the shaft between the two bearings. It will be noticed that I form the flange $d$ broad enough to extend a short distance over the ends of this sleeve, thus still further averting the danger of dust entering the bearing.

I am aware that ball-bearings have heretofore been made having one solid ring and one ring divided circumferentially, but in all such bearings the grooves in the rings for the reception of the balls have been made to perfectly fit the balls, by reason of which the friction upon the lateral surfaces of the balls is so great as to greatly deteriorate the utility of the bearing, while with my bearing the grooves are elliptical with the lateral diameter the longer, thus entirely averting the danger of lateral friction and insuring a direct diametrical bearing upon the balls, as hereinbefore suggested.

Having thus fully described my invention, what I claim, and desire to secure by Letters Patent of the United States, is—

In a ball-bearing, a solid outer ring having a bead at its periphery, a circumferentially-divided inner ring, said rings constructed to form a laterally-elongated groove for the travel of the balls, a shaft upon which one section of the divided ring is secured, there being a screw-thread on the shaft, a nut engaging said screw-thread and securing the outer section of the ring to the shaft, said nut having a flange projecting from its periphery over said bead to form a dust-guard, a washer between the divided sections of the inner ring, and a washer between the surfaces of the rings and the nut, substantially as and for the purpose set forth.

Signed at Grand Rapids, Michigan, July 3, 1896.

JAMES R. DENISON.

In presence of—
 MABELLE W. JONES,
 ITHIEL J. CILLEY.